Nov. 11, 1952  S. LINDEN  2,617,119
CAR BED
Filed Aug. 28, 1951  2 SHEETS—SHEET 1
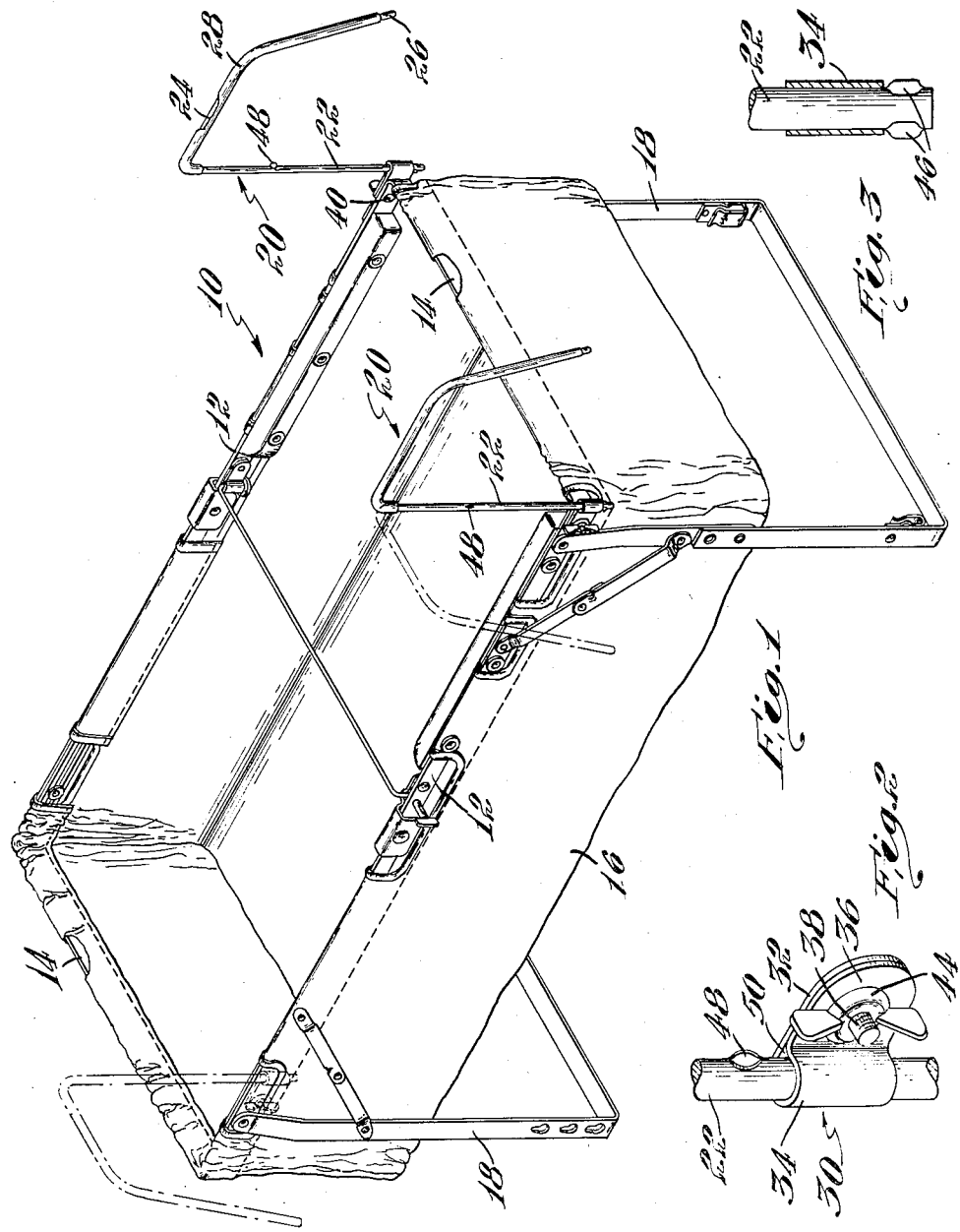
Inventor
Samuel Linden
by Roberts, Cushman & Grover
Att'ys.

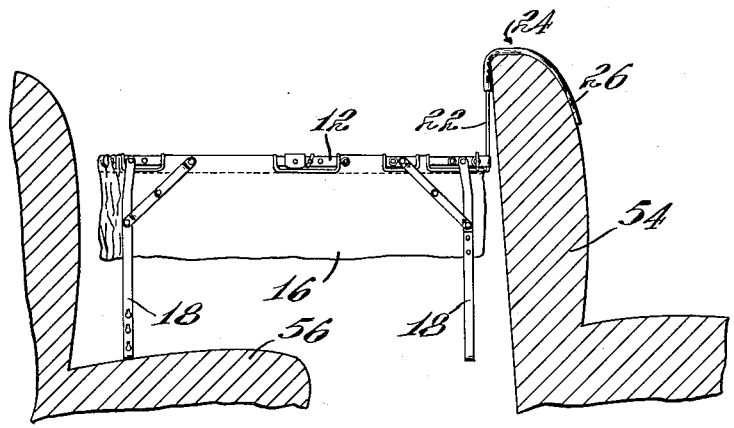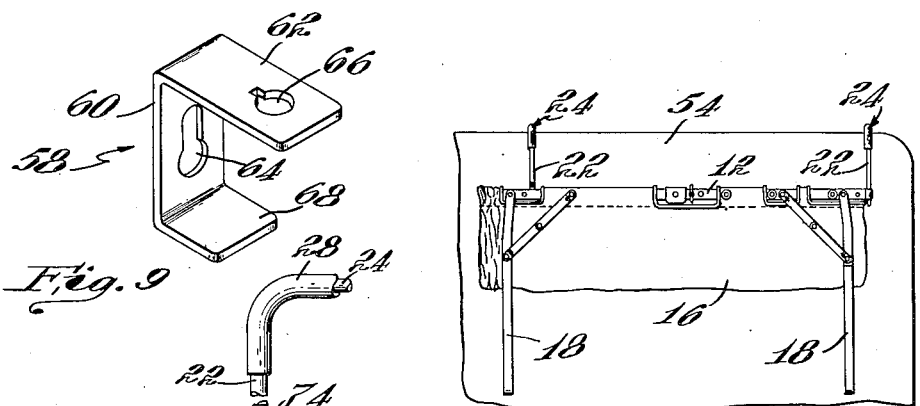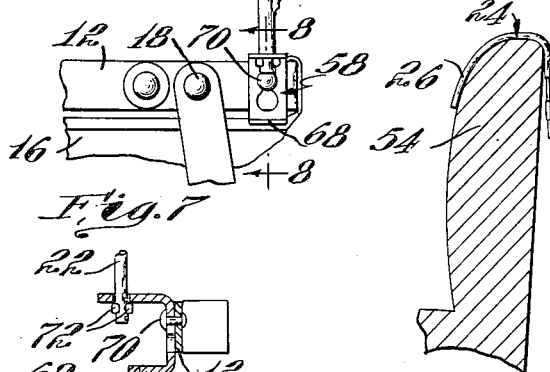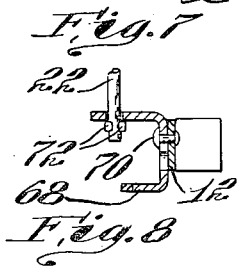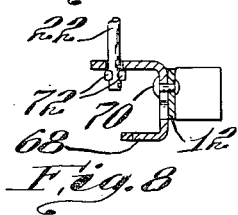

Patented Nov. 11, 1952

2,617,119

UNITED STATES PATENT OFFICE 2,617,119

CAR BED

Samuel Linden, Swampscott, Mass., assignor to Bunny Bear Inc., Everett, Mass., a corporation of Massachusetts Application August 28, 1951, Serial No. 243,938

9 Claims. (Cl. 5—94)

This invention relates to portable infants beds commonly known as car beds and more especially to improved means for supporting the bed within the car.

The conventional car bed consists of a rigid frame having side and end rails from which is suspended a hammock. Legs are attached to the frame so that it may stand on the floor and arms are attached to one of the end rails so that it may be suspended from the top of the back of the front seat with the legs at the opposite end resting on the back seat. As thus equipped, the bed runs parallel to the direction of motion of the car. Such car beds cannot be used in coupes and other small cars where there is not much room between the front and back seats. The principal objects of this invention are to provide a bed which may alternatively be positioned so as to extend parallel to the direction and movement of the car or transversely thereto and consequently will fit every car no matter how small the back seat. A further object is to provide simple attachments for adapting the bed to use in either of the foregoing positions, which will be easy to adjust and which will not be easily detached and/or lost.

As herein illustrated, the frame of the bed has attached to it a pair of arms which may be placed over the top of the seat-back to suspend that portion of the bed which the handles are attached while the opposite portion rests on the seat behind. The arms are designed to support the frame either from one end or from a side and accordingly, one or both of the arms are made transferable. In its simplest aspect, one of the arms may be made fast to an end or side close to the intersection of an end and side and the other may be attached to the opposite end or side remote from the one arm. Alternatively, both arms may be made fast to the ends of an end or side. Each arm has on it vertically spaced nubs which afford means for heightwise adjustment of the suspension of the bed frame. One set of nubs are at the lower ends of the arms and cooperate with the fastening means to support the frame from ends of the arms. Another set of nubs are placed intermediate the ends of the arms and are cooperable with the fastening means to hold the bed frame elevated.

The invention will now be described in greater detail with reference to the accompanying drawings wherein:

Fig. 1 is a perspective view of a car bed showing supporting arms in full lines fastened to one end and in dotted lines fastened to a side;

Fig. 2 is a perspective view to much larger scale showing the fastening means for an arm with a fragmentary portion of the arm extending through it;

Fig. 3 is a vertical section through the fastening means showing the nubs at the lower end of the arm engaged with the lower end of the fastening means;

Fig. 4 is an elevation to smaller scale showing the car bed position between the front and back seats of an automobile extending parallel to the direction of movement of the car with the supporting arms placed over the top of the front seat and the leg at the opposite end resting on the back seat;

Fig. 5 is an elevation of the car bed placed transversely of the car with the arms rearranged so as to extend over the back of the front seat;

Fig. 6 is an end view of the car bed supported transversely of the car as shown in Fig. 5;

Fig. 7 is a fragmentary elevation near one corner at the side of the bed frame showing alternative means for attaching the supporting handles;

Fig. 8 is a section taken on the line 8—8 of Fig. 1; and

Fig. 9 is a perspective view of a fastening element detached from the frame.

Referring to the drawings the car bed as shown in Fig. 1 at 10 has a rigid substantially rectangular frame consisting of side members 12 and end members 14 suitably joined in accordance with Patent No. 2,488,225, to provide for converting the frame from a bed frame to a chair frame. Since this part of the construction is not a feature of the present invention, it will not be described further herein. A flexible cloth hammock 16 is hung from the frame and legs 18, are pivotally fastened in collapsible manner so that the bed may be supported at its opposite ends from the floor when desired or in folded positions from the base of the chair frame.

A pair of supporting arms 20—20 are provided which may be attached to an end of the bed frame as illustrated in full lines in Fig. 1, so as to support the end of the frame over the top of the back of the front seat of an automobile with the leg 18 at the opposite end of the frame resting on the rear seat or it may be fastened to the side of the frame as illustrated in dot and dash lines, so as to support the frame from the top of the back of the front seat transversely of the car with its legs 18—18 at the opposite side resting on the back seat. The latter position is especially suited to coupés, club coupés and small cars where the distance between the front seat and back seat is very short and the bed could not be placed lengthwise of the car between the seats. As illustrated (Figs. 1, 2 and 3), each arm has a straight staff portion 22 from the upper end of which projects at right angles, a substantially horizontal portion 24 and a downwardly inclined portion 26. A rubber tube or other soft covering 28 is slipped over the horizontal and inclined portions 24 and 26 to prevent damage to the back of the car seat. The arms 20 are fastened near the intersection of the sides and end at an end or side of the car bed by fastening means in the form of clamps 30 (Fig. 2). Each clamp 30 consists of a piece of sheet metal bent intermediate its ends so as to provide a flat-tab 32, a cylindrical portion 34 and a flat-tab 36 adapted to lie flat against the tab 32. The tabs 32 and 36 have registering openings which may be placed over openings 40 made in the side members 12 near their ends and fastened thereto by bolts 38 extending through the frame holes and through the registering openings in the clamps, wing nuts 44 being placed on the bolts for this purpose. The clamps are fastened to the frames so that the cylindrical sleeve-like portions 34 extend vertically, that is perpendicular to the plane of the frame and the staff portions of the supporting arms 20 are mounted in the sleeve portions so as to slide vertically therein. The lower end of each staff has integral with it a pair of diametrically arranged nubs 46 (Fig. 3) and when the car bed is suspended longitudinally of the car from the lower ends of the arms the nubs engage the lower sides or ends of the sleeves. The nubs cannot pass through the sleeves and hence limit the lower-most position of the car bed. When the car bed is placed longitudinally of the car as shown in Fig. 4, the bed frame will be suspended from the lower ends of the staffs against the nubs 46, the legs 18 at the opposite end of the frame resting on the rear seat 56 near the back part. When the bed is placed transversely of the car (Figs. 5 and 6) the point of suspension must be raised so as to keep the bed level because of the fact that the legs 18 rest on the forward edge of the seat which is considerably higher than the rear part of the seat as shown in Fig. 4. To prepare the bed for disposition, transversely of the car, the supporting arm 20 at the forward corner as shown in Fig. 1, is swung from the full line position to the dotted line position and then the other handle and its fastening clamp 30 are removed and placed at the forward side of the car bed as shown in dotted lines in Fig. 1. Prior to mounting the bed in place, the staffs 22 are pushed downwardly through the sleeves 34 to shorten their effective length and are held in shortened positions by nubs 48 (Figs. 1 and 2), only one of which is provided on each staff. By proper orientation of the arm, as the staff is pushed downwardly the nub 48 may be slid through the opening 50 (Fig. 2) at the junction of the plates 32 and 36, so that the nubs may be moved to positions below the lower ends of the sleeves 34. If the arms are then rotated to the position shown in dotted lines, the nubs 48 will prevent the arms from sliding upwardly again and thus hold the beds suspended, for example as shown in Figs. 5 and 6, at a higher level.

Alternative clamping means for fastening the handles to the bed is illustrated in Figs. 7 to 9 inclusive, this latter means providing for somewhat easier transfer of the arms from one position to another and less likelihood of the loss of parts. The clamping means in this case consist of a bracket 58 (Fig. 9) having a shank 60 from the upper end of which projects a horizontal arm 62. Both the shank and arm have key hole slots 64 and 66 respectively. The side and end members of the frame have secured to them, near their opposite ends rivets 70 (Fig. 7) having heads which will enter the enlarged parts of the key-hole slots 64. The staff portions 22 of the arms 20 are inserted through the key-hole slots 66 and then the lower ends of the staffs are pinched to provide diametrically positioned nubs 72 and at their intermediate portions to provide a nub 74. As thus constructed an arm and its bracket may be transferred from an end to a side or vice versa, by placing the key-hole slot 64 over the head of a rivet 70 and pushing it downwardly to engage the narrow part of the key-hole slot with the neck of the rivet behind its head. The heightwise position of the arms may be adjusted so that the bed is suspended from their lower ends by engagement of the nubs 72 with the underside of the arm 62.

If it is desirable to raise the frame, the staffs may be turned to bring the nubs 74 in vertical alignment with the narrow portions of the key-hole slots and then pushed downwardly through the key-hole slots until the nubs 74 pass through the narrow parts to the undersides of the arms 62 whereupon they may be turned back to their original positions out of alignment with the narrow portions of the slots so that the nubs cannot re-enter the slots.

Each bracket has a secondary horizontal arm 68 at its lower end which has an edge terminating substantially vertically below the inner side of the key-hole slot 66 so that it bears upon the staff 22 when the latter is thrust downwardly to its intermediate portion and thereby tends to steady the suspension.

This latter construction wherein the arm and bracket are assembled and one cannot be removed from the other, have the advantage that in transferring an arm from an end to a side or vice versa, there are no loose parts which may be dropped and lost.

It should be understood that the present disclosure is for the purpose of illustration only and that this invention includes all modifications and equivalents which fall within the scope of the appended claims.

I claim:

1. In an infant's car bed, having a rigid substantially rectangular frame with end and side rails from which is suspended a hammock, a pair of supporting arms, a pair of clips attached to the frame, each clip having a vertically disposed sleeve, said arms being slidable vertically, perpendicular to the plane of the top of the frame in said sleeves, vertically spaced nubs on the arms located near the lower ends of the arms and intermediate the ends, the lower nubs being engageable with the sleeves to hold the frame at the lower extremities of the arms and the intermediate nubs being movable through the sleeves when the arms are rotated to a given position to permit movement of the arms through the sleeves but engageable with the sleeves in other positions heightwise of the arms, one of said clips being located close to the intersection of a side rail and end rail and serving to support the frame at the side or end and the other being movable to an end or side remote from the one, for supporting the other arm as one of a pair at an end or at a side.

2. In an infant's car bed, having a rigid substantially rectangular frame with end and side rails from which is suspended a hammock, arms for supporting the frame, a pair of detachable brackets, each having a key-hole slot therein, studs located at opposite ends of one end of the frame and at opposite ends of one side of the frame for engagement with the key-hole slots, said pair of detachable brackets being attachable either to the studs at the end or side and said brackets having apertures therein, perpendicular to the plane of the top of the frame in which are slidably mounted said arms, said arms having vertically spaced nubs thereon engageable with the bracket portions bordering the apertures to hold the arms in one or the other of two positions.

3. In an infant's car bed, having a rigid substantially rectangular frame with end and side rails from which is suspended a hammock, arms for supporting the frame, a pair of detachable angle brackets, each having a vertical leg with a key-hole slot through it, headed studs located at opposite ends of one end of the frame and at opposite ends of one side of the frame, said pair of angle brackets being attachable either to the studs at the end or side, and each angle bracket having horizontal arms with a key-hole slot in one of them in which is slidably mounted one of said arms, said arms having spaced nubs located at the ends and intermediate the ends, said nubs at the ends of the arms limiting the lower-most position of the frame on the arms and said intermediate nubs being engageable with the angle brackets to limit the position of the frame to an intermediate height on the arms.

4. In an infant's car bed, having a rigid substantially rectangular frame including supporting legs and a hammock slung from the frame, a pair of suspension arms each arm having a straight staff from the upper end of which projects a hook and means adjacent certain corners of the frame for selectively and removably receiving said arms and retaining them in either one of two alternative positions in which the staffs of the pair are substantially perpendicular to the upper plane of the frame and the hooks project substantially at right angles to an end or a side to suspend the frame from one end in one position or from one side in its alternative position.

5. In an infant's car bed, having a rigid substantially rectangular frame including supporting legs and a hammock slung from the frame, a pair of suspension arms, each arm having a straight staff and a hook at its upper end, and spaced pairs of headed studs made fast to the sides and ends of the frame, said arms being detachably interengageable with said headed studs to make the arms fast to the frame in either one of two alternative positions in which the staffs of the arms of the pair are substantially perpendicular to the upper plane of the frame and the hooks project substantially at right angles to an end or side to suspend the frame from an end in one position or from its side in its alternative position.

6. In an infant's car bed having a rigid substantially rectangular frame, including pairs of spaced rails and legs connected to said rails for supporting the same, said rails intersecting to form the four corners of the frame, a hammock slung from the rails, a pair of suspension arms, each arm having a straight staff from the upper end of which projects a hook, and anchoring means carried by said frame adjacent certain of the corners thereof, each anchoring means re- movably receiving one of said arms and selectively retaining it in a position projecting laterally from either of the sides forming the adjacent corner of the frame.

7. In an infant's car bed having a rigid substantially rectangular frame, including pairs of spaced rails, said rails intersecting to form the four corners of the frame, a hammock slung from the rails and supporting legs fastened to the rails, a pair of suspension arms, each arm having a straight staff from the upper end of which projects a hook, and anchoring means near three of the corners of the frame selectively to removably receive said arms and retain them, in one position with the hooks projecting laterally from the side which lies between the intermediate one of the anchoring means and the anchoring means at one side thereof and in another position with the two hooks projecting laterally from the side which lies between the intermediate one of the anchoring means and the anchoring means at the other side thereof.

8. In an infant's car bed, a rigid substantially rectangular frame having intersecting side rails from which is suspended a hammock, a pair of supporting arms, a pair of means attaching said arms to the frame, said arms being mounted on said attaching means and movable thereon, perpendicular to the plane of the top of the frame, to extend or shorten the effective length of the arms, relative to the plane of the frame, nubs on the arms cooperable with the attaching means to limit the perpendicular position of the arms, one of said attaching means being located close to the intersection of two side rails so that the arm attached to the frame thereby serves to support the frame alternatively from one side or from the intersecting side and the other being movable to the end of the one side rail or to the end of the intersecting side rail to attach the other arm to the frame so as to form a pair of arms projecting from the one side or from the intersecting side.

9. In an infant's car bed, having a rigid substantially rectangular frame with end and side rails from which is suspended a hammock, a pair of supporting arms, a pair of means attaching said arms to the frame, said arms being mounted on said attaching means and movable thereon, perpendicular to the plane of the top of the frame to extend or shorten the effective length of the arms relative to the plane of the frame, vertically spaced nubs on the arms cooperable with the attaching means to limit the perpendicular position of the arms relative to the plane of the frame to one of two positions, one of said attaching means being located close to the intersection of a side rail and end rail and serving to support the frame from the side or end and the other being movable to an end rail or side rail remote from the one attaching means to attach an arm to the frame so as to form a pair at a side or at an end.

SAMUEL LINDEN.

REFERENCES CITED

The following references are of record in the file of this patent:

UNITED STATES PATENTS

| Number | Name | Date |
|---|---|---|
| 1,217,474 | MacGowan | Feb. 27, 1917 |
| 1,344,009 | Turner | June 22, 1920 |
| 2,488,225 | Mover | Nov. 15, 1949 |
| 2,503,602 | Titley | Apr. 11, 1950 |
| 2,586,237 | Linden | Feb. 19, 1952 |